United States Patent [19]

Kihlstrom

[11] Patent Number: 4,607,151

[45] Date of Patent: Aug. 19, 1986

[54] SOLDERING IRON WITH FUME SUCTION TUBE

[75] Inventor: Christer Kihlstrom, Skara, Sweden

[73] Assignee: Lectrostatic Marknads AB, Skara, Sweden

[21] Appl. No.: 711,684

[22] Filed: Mar. 15, 1985

[30] Foreign Application Priority Data

Apr. 5, 1984 [SE] Sweden ................ 8401915

[51] Int. Cl.$^4$ .................. H05B 1/00; B23K 3/00; B08B 15/04
[52] U.S. Cl. .................. 219/230; 219/236; 228/20; 228/52
[58] Field of Search .............. 219/230, 236; 228/20, 228/51-55, 57

[56] References Cited

U.S. PATENT DOCUMENTS 2,041,018  5/1936  Persons ........................ 228/20
4,358,662  11/1982  Cranor et al. ................. 219/230

FOREIGN PATENT DOCUMENTS 100229  2/1984  European Pat. Off. .......... 219/230
177878  11/1982  Japan ......................... 219/230
221857  10/1968  U.S.S.R. ...................... 219/230

Primary Examiner—A. Bartis
Attorney, Agent, or Firm—Sughrue, Mion, Zinn, Macpeak and Seas

[57] ABSTRACT

A soldering iron for withdrawing by suction resin-containing soldering fumes includes an electric heating element (2) enclosed in a metallic casing and extending from one end of a handle (1), a metallic fume suction nozzle (6) has one end (7) lying in proximity to a soldering tip (5) mounted to the outer end of the heating (2) and its other end (8) connected proximate the one end of the handle to the first end of a flexible plastic e.g., silicone polymer; suction hose (10) removably extending through a bore (15) in the handle (1) and connected at its other end to suction source (11). The nozzle (6) is coupled in metallic heat transfer contact with the casing of the heating element (2) by metallic member (12, 13) and is thereby maintained at a temperature such that resins present in the fumes do not precipitate in the nozzle (6) but instead condense in the plastic suction hose (10), which can be easily removed from the handle for cleaning. The exterior surface of the plastic hose (10) within the bore (15) may be cooled by air drawn through the bore by the suction source (11) to promote condensation of the resins therein.

7 Claims, 3 Drawing Figures

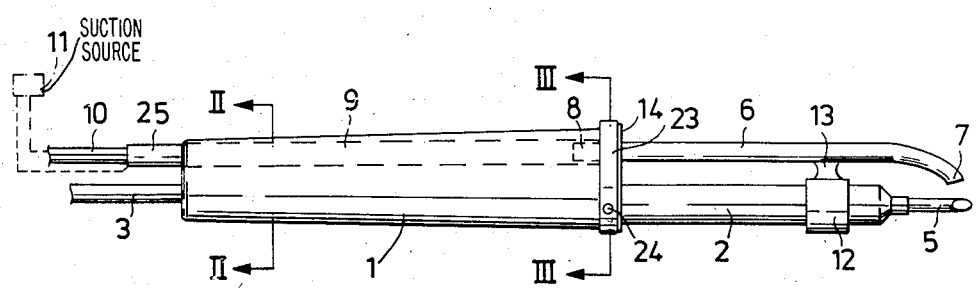
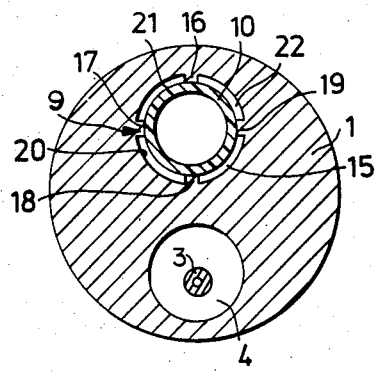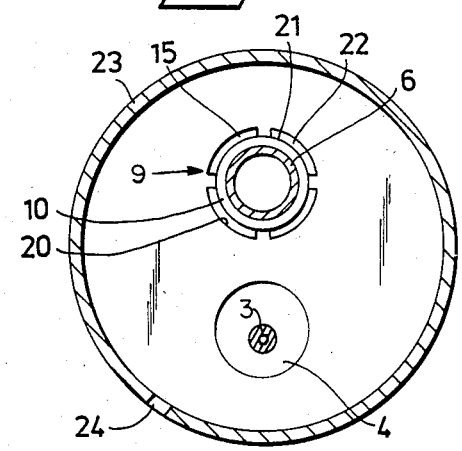

SOLDERING IRON WITH FUME SUCTION TUBE

BACKGROUND OF THE INVENTION

The invention relates to a soldering iron equipped with means for removing by suction solder fumes created by resin incorporated in the solder, comprising a handle having an electrically heated element with an outer metal casing, a soldering tip connected to said element, and a metallic suction nozzle, one end of which nozzle lies in the proximity of the soldering tip and the other end of which is connected to a suction channel located in the handle, this suction channel in turn being connected to a flexible plastics hose connected to a suction source.

Such soldering irons are particularly suited for removing the irritating and often harmful fumes generated by the solder flux incorporated in the solder or used separately in conjunction therewith, this flux containing volatile resins. The most serious drawback with soldering irons of this kind is the relatively short time in which they can be used before needing to clean the nozzle and the suction channel. In normal soldering irons of this kind, nominally about 30 liters of air are drawn through the nozzle each minute, which means that the temperature of the nozzle is much lower than that of the solder fumes generated. This means in turn that vaporised resins condense and solidify in the nozzle and/or the suction channel such that the suction effect is totally lost as a result of these resin deposits after only some few hours of use. These deposits, or resin plugs, are removed, for example, with the aid of chemical solvents or by mechanical means, which is often a time-laborious task.

SUMMARY OF THE INVENTION

A prime object of the invention is to provide a soldering iron in which the deposit of resins in the suction nozzle of the iron is completely or at least substantially avoided, and to the unavoidable deposition of such tough resins is shifted to the readily accessible hose-end connected to the nozzle.

This object is realized by heating the nozzle via a heat transfer coupling to the hot outer casing of the electrically heated element, and attendantly cooling the hose portion within the handle to promote the precipitation of the fume vapors thereon.

BRIEF DESCRIPTION OF THE DRAWINGS

FIG. 1 is a side view of an embodiment of the soldering iron according to the invention;

FIG. 2 is a sectional view taken on the line II—II in FIG. 1; and

FIG. 3 is a sectional view taken on the line III—III in FIG. 1.

DETAILED DESCRIPTION OF THE PREFERRED EMBODIMENTS

The illustrated soldering iron has a handle 1 made of plastics, wood or some other suitable material, and a heating element 2 which extends from one end of the handle 1 and which has a metal outer casing, suitably made of steel. The heating element 2 has an internal resistance member to which voltage is applied via a cable 3 passing through a bore 4 in the longitudinal direction of the handle 1. Mounted on the outer end of the element 2 is an exchangeable soldering tip or bit 5 with which solder and flux are melted to effect a soldering operation. Extending along the element 2 is a tubular metal suction nozzle 6 with the outer end 7 thereof directed towards the soldering site. The rear end 8 of the nozzle 6 is connected to a suction channel 9 passing through the handle, this suction channel in turn being connected to a suction hose 10 which is connected to a suction source 11, such as an exhaust fan. When the suction source 11, is operating fumes generated during a soldering operation are withdrawn from the soldering site by suction and depart from the fan 11 through a filter means not shown.

In order to prevent the hot soldering fumes withdrawn from the soldering site from cooling in the suction nozzle 6 to such an extent that resin precipitates on the inner walls thereof, the metallic suction nozzle 6 is in direct metallic connection with the metallic casing of the element 2, and thus in heat transfer connection therewith, in accordance with the present invention. In the illustrated embodiment, this heat transfer connection comprises a metal ring 12 which is placed on the metal casing of the element 2 and which is welded or soldered to the suction nozzle via a metal bridge 13 formed on the ring 12. This enables the nozzle 6 to be readily heated by heat drawn from the heating element. As will be understood, the metal ring 12 may be supplemented with one or more metal rings attached to the nozzle 6, or the ring may be given an axial length corresponding, for example, to the total length of the metal casing, in which case the bridge 13 comprises an elongated flange between the long ring or sleeve and the nozzle.

In order to obtain a concentrated, readily accessible resin deposit, the suction channel 9 comprises the suction hose 10 which is inserted into a bore 15 in the handle to a location therein approximately adjacent the end of the handle, whereat the end 8 of the nozzle 6 is inserted into the end of the suction hose through an opening located in an end plate 14. In the illustrated embodiment the suction hose 10 is considered to comprise a continuous length of hose extending to the suction source 11. It will be understood, however, that the hose may also comprise a plurality of hose sections joined together by means of connectors. At least that part of the suction hose location within the handle preferably comprises a silicone polymer. When the hot soldering fumes have passed through the heated suction nozzle 6 and flow into the plastics suction base 10 the fumes are cooled rapidly to a temperature at which the resin present in the fumes precipitates onto the inner surfaces of the hose. This precipitate can be readily removed, by withdrawing the hose 10 from the bore 15 in the handle 1 and lightly rubbing the end of the hose, thereby to loosen the deposits so that they fall from the hose. In order to provide for a more rapid cooling of the hot soldering fumes, longitudinally extending fins 16,17,18,19 or like spacers may be arranged in the bore 15, as illustrated in FIGS. 2 and 3, these spacers forming between the inner wall 20 of the bore and the outer wall 21 of the hose 10 at least one air through-flow channel, for example the channel 22, which communicates with ambient air. The handle 1 may be provided with a hollow housing 23 closed by means of the cover plate 14 and into which the channel or channels 22 discharge. In this respect air can be drawn in either by venting the cover plate 14 to render it pervious or, for example, by providing a vent, hole 24 in the wall of the housing 23. The channel or channels 22 also opens out, or open out, in a sleeve 25, FIG. 1, and can there be connected to a suction source, which suitably comprises the suction source 11. In addition to the aforesaid rapid cooling of the soldering fumes, and therewith precipitation of resin in the aforementioned hose end, which due to its flexibility and the choice of material for its manufacture is readily cleansed, the additional advantage is afforded that the handle 1 is always maintained at a comfortable temperature.

If for some reason or other a layer of resin should be deposited in the nozzle, this layer can be rapidly removed by interrupting the suction of air into the nozzle. As a result of the aforesaid heat transfer connection the nozzle will be quickly heated to a high temperature, causing the resin to melt and run from the nozzle.

The illustrated and described embodiment of the invention can also be modified in ways other than those inferred above. For example, the ring or sleeve 12 may comprise a metal clamp means connected with the nozzle 6 and clamped firmly on the heating element 2. The illustrated slightly conical shape of the handle 1 can be replaced with any suitable ergonometrical configuration.

I claim:

1. A soldering iron, comprising:
   (a) an elongate handle (1),
   (b) an electrical heating element (2) mounted to one end of the handle and extending outwardly therefrom,
   (c) an outer metal casing surrounding the heating element,
   (d) a soldering tip (5) mounted to an outer end of the heating element,
   (e) a through channel (9) defined within and extending through the handle,
   (f) a flexible plastic hose (10) removably disposed in the channel,
   (g) a metal suction tube (6) having an outer, nozzle end (7) disposed proximate the soldering tip and an inner end (8) removably coupled to one end of the hose proximate said one end of the handle,
   (h) a suction source (11) coupled to another end of the hose remote from said one end of the handle, and
   (i) metallic heat transfer means (12, 13) disposed between and in intimate contact with the heating element metal casing and the metal suction tube for heating the suction tube to prevent the precipitation of resinous soldering fumes therein, such fumes instead precipitating in the flexible plastic hose which may be easily removed and cleaned.

2. A soldering iron according to claim 1, wherein the hose (10) is made of a flexible silicone polymer material.

3. A soldering iron according to claim 1 or claim 2, wherein the heat transfer means comprises at least one metal ring (12) detachably connected to the metal casing of the heating element (2), said metal ring being firmly connected to the suction tube (6).

4. A soldering iron according to claim 1, wherein said through channel comprises a bore (15) having spacer means (16, 17, 18, 19) on an inner wall thereof (20) which abut an outer wall (21) of the hose to define therewith at least one air through-flow channel (22), to thereby cool the hose and encourage the precipitation of resinous fumes therein.

5. A soldering iron according to claim 4, wherein the air through-flow channel is connected to said suction source (11).

6. A solder iron according to claim 4 or 5, wherein the handle (1) has a housing (23) on said one end thereof facing the soldering tip (5), the inner end (8) of the suction tube (6) passes through an interior of said housing, and further comprising a vent (24) in the housing for communicating ambient air with the air through-flow passage (22).

7. A soldering iron according to claim 4 or claim 5, wherein the heat transfer means comprises at least one metal ring (12) detachably connected to the metal casing of the heating element (2), said metal ring being firmly connected to the suction tube (6).

* * * * *